United States Patent [19]

Logsdon

[11] 4,309,007
[45] Jan. 5, 1982

[54] SOUND INSULATING SUPPORT FOR PLUMBING PIPES

[75] Inventor: Daniel D. Logsdon, Fullerton, Calif.

[73] Assignee: The Logsdon Foundation, Stanton, Calif.

[21] Appl. No.: 153,033

[22] Filed: May 27, 1980

[51] Int. Cl.³ .................................................. F16L 5/00
[52] U.S. Cl. ..................................... 248/56; 24/16 R; 248/74 R
[58] Field of Search ................. 248/56, 74 R, 74 A, 248/68 R, 610; 16/2; 138/106, 107; 24/16 R, 257; 174/31 R, 152 G, 153 G; 285/159, 205

[56] References Cited

U.S. PATENT DOCUMENTS

| | | | |
|---|---|---|---|
| 3,240,502 | 3/1966 | Snyder | 248/56 X |
| 3,366,356 | 1/1968 | Fisher | 16/2 X |
| 3,548,079 | 12/1970 | Jones | 174/153 G |
| 3,684,220 | 8/1972 | Logsdon | 248/56 |
| 3,684,223 | 8/1972 | Logsdon | 248/74 PB |
| 3,884,438 | 5/1975 | Logsdon | 248/59 |
| 3,889,909 | 6/1975 | Koscik | 174/153 G X |
| 4,033,535 | 7/1977 | Moran | 174/153 G X |
| 4,089,496 | 5/1978 | Mizusawa | 174/153 G X |
| 4,216,930 | 8/1980 | Rossler | 174/153 G X |

Primary Examiner—J. Franklin Foss
Attorney, Agent, or Firm—K. H. Boswell; Edward D. O'Brian

[57] ABSTRACT

A sound insulating support member for isolating a plumbing pipe or other tubular member from a support surface includes an insert member formed of a material substantially incapable of transmitting sound vibrations and sized to be capable of encircling the pipe or tubular member. The insert member fits within a sleeve member which is formed of a semiresilient material capable of maintaining its shape at rest but capable of being flexed when subjected to a force. Both the sleeve member and the insert member contain a slit. The insert member is retained within the sleeve member such that the slit of the insert member is aligned with the slit of the sleeve member and when both the sleeve and the insert are open the pipe or tubular member can be inserted through the slits and the sleeve and insert close around the pipe or tubular member to cradle the tubular member within the insert which in turn is fixedly held within the sleeve. A support structure is attached to the sleeve which is capable of being fixedly attached to the support surface. This holds the sleeve and the pipe or tubular member contained within the insert fixedly locked to the support surface yet sound isolates the pipe from the support surface.

14 Claims, 7 Drawing Figures

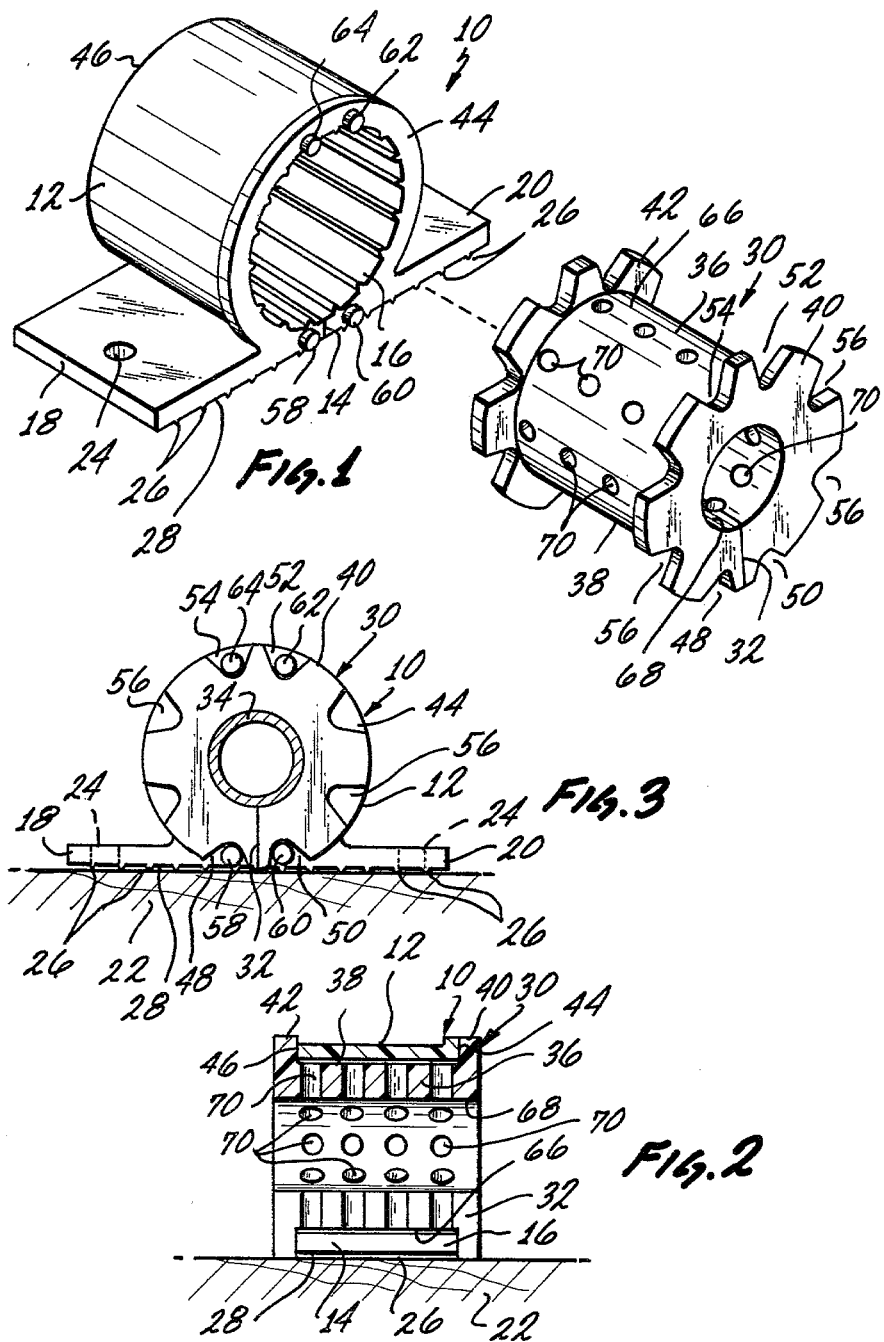

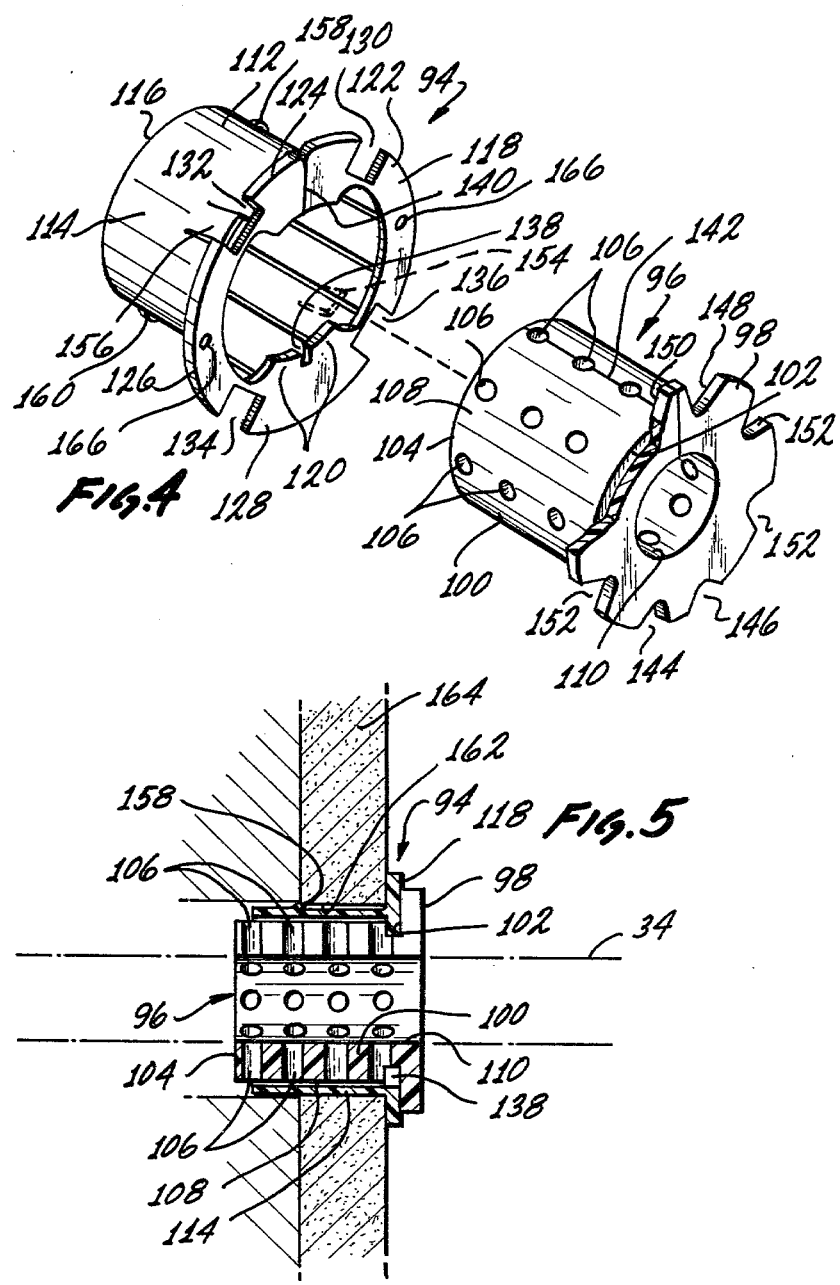

SOUND INSULATING SUPPORT FOR PLUMBING PIPES

BACKGROUND OF THE INVENTION

A sound insulating support member is described for fixedly holding a pipe or tubular member to a support surface in a manner which does not allow for propagation of sound from the pipe to the support surface. Additionally the insulating support member can form a barrier restricting fluid flow from one side of the support surface to the other about the surface of the pipe or tubular member.

In U.S. Pat. Nos. 3,684,220 and 3,684,223 both assigned to the assignee of this patent application, a pipe holder and pipe clamp are described. These pipe holders and pipe clamps were developed to enable copper tubing or similar type tubing or pipe to be attached to support structures. As is discussed in these patents copper tubing or the like has many distinct advantages. However, because of its thin wall thickness it is subject to deformation or other damage if not properly mounted to a support structure. The pipe holder and clamp of these prior patents, however, while serving to solve many of the problems associated with copper tubing have not solved all of them.

Since copper tubing is normally employed as a continuous pipe with as few joints as possible sound propagation within the pipe is a source of constant annoyance to the inhabitants of a structure wherein the pipe is located. The devices disclosed in the above noted patents both are solid monolithic structures which contact both the support surface and the pipe. The devices of the above noted patents attempt to minimize noise propagation by contacting the pipe with thin flanges or ribs. While these do serve to limit some of the noise propagation, the thin flanges or ribs are part of the monolithic structure and as such are amply capable of transmitting some vibrations from the pipe to the support structure.

In certain installations such as buildings having an external structural shell and internal walls which serve no structural purpose but only divide the interior of the building into sections, the interior walls are generally constructed of metal panels or similar materials. This type of panel serves as a sound amplifier if directly connected to a vibrating pipe. It is particularly annoying to be in such a structure when a sound is propagated through a pipe which is not sound insulated from these panels.

In addition to allowing sound propagation from the pipe to a supporting structure the devices noted in the above patents did not serve to seal the opening in the support structures through which a pipe traversed. Indeed, because the pipe was suspended by ribs, flanges or the like there are openings along the surfaces of the pipe between adjacent ribs, etc. Pipes, especially cold water pipes, will serve as condensers for any moisture in the air. If these moisture laden pipes traverse through one of the devices noted in the above mentioned patents the moisture was transferred to the clamp or holder at the contact point wherein the fins, ribs, etc. contacted the pipe. If sufficient moisture built up on the clamp or holder this moisture could very easily be transferred to the supporting structure or wall. This is particularly disadvantageous to installations wherein dry-wall or gypsum board is used. Repeated contact of the interior of the gypsum board with moisture will eventually destroy the integrity of this type of wall.

SUMMARY OF THE INVENTION

In view of the above it is a broad object of this invention to provide a supporting member capable of fixedly holding a pipe or other tubular member to a support surface in a manner that inhibits propagation of sound vibrations from the pipe or tubular member to the support member and further is also capable of inhibiting fluid flow from one surface of a support surface to either the interior of or the other surface of a support surface. It is a further object to provide a support member which because of its simplified construction and inexpensive materials is easily manufactured and can be utilized without imposing an economic burden on the user. Additionally it is an object to provide a support member which is easily attached by a plumber or the like without the expenditure of an undue amount of expensive labor time.

These and other objects as will be evident from a remainder of this specification are achieved in a sound insulating support member for isolating a tubular member from a support surface which comprises: insert means formed of a flexible material substantially incapable of transmitting sound vibrations and including an insert wall sized so as to be capable of encircling said tubular member; sleeve means formed of a semiresilient material capable of maintaining its shape at rest and flexing under the influence of applied force, said sleeve means including a sleeve wall sized such that said insert means is capable of fitting within it; each of said sleeve means and said insert means including a slit dividing said walls of both said sleeve means and said insert means such that the portions of said walls located on the respective sides of said slits are capable of being moved with respect to each other allowing both said sleeve means and said insert means to be opened and closed about said slits; retaining means capable of retaining said insert means in a fixed position within said sleeve means and maintaining said slit in said insert means substantially aligned with said slit in said sleeve means such that both said insert means and said sleeve means are capable of being opened at their respective slits to allow said tubular member to pass through said slits locating said tubular member within both said insert means and said sleeve means and of being closed to cradle said tubular member within said insert means and fixedly hold said insert means within said sleeve means; said sleeve means including support attaching means capable of attaching to said support surface to fixedly hold said sleeve means to said support surface.

Preferably the insert means comprises a cylindrical insert of flexible material which has an axially oriented slit at one place in its cylindrical wall. Preferably the sleeve means comprises a cylindrical sleeve also having an axially oriented slit through its cylindrical wall.

In one embodiment of the invention the insert includes a split annular flange located on one of its ends and in another embodiment of the invention the insert includes a split annular flange located on both of its ends. In both of these embodiments preferably the retaining means includes a plurality of projections projecting axially around the perimeter of one or both of the ends of the cylindrical sleeve and the cylindrical insert includes a plurality of apertures equal in number to the projections located on the surface of one or both of the flanges and located in positions such that the projections fit into the apertures. This locks the insert to the sleeve and when the sleeve is open about its slit the insert is also concurrently open about its slit allowing both the sleeve and the insert to be easily slipped around a pipe or tubular member.

In one embodiment of the invention the cylindrical sleeve includes an annular flange projecting radially from one of its ends. This embodiment is designed to fit within a circular hole in a support wall. The flange on the cylindrical sleeve abuts against one side of the support wall and one or more locking lugs located on the outside surface of the cylindrical sleeve fits against the other side of the support wall fixedly retaining the sleeve and insert in position. In this embodiment inwardly extending portions of the sleeve flange fit into a groove in the insert holding the insert fixed within the sleeve.

In another embodiment the retaining means includes two attaching flanges integrally formed with the cylindrical sleeve. One of the flanges is attached to one side of the slit and the other of the flanges attaches to the other side of the slit. In one form of this embodiment the flanges project radially from the sleeve and in another form the flanges project tangentially to the sleeve.

DETAILED DESCRIPTION OF THE DRAWINGS

This invention will be better understood when taken in conjunction with the drawings wherein:

FIG. 1 is an isometric view of one embodiment of the invention;

FIG. 2 is a side elevational view in section of the embodiment shown in FIG. 1;

FIG. 3 is an end elevational view of the embodiment shown in FIG.1;

FIG. 4 is an isometric view of a second embodiment of the invention;

FIG. 5 is a side elevational view in partial section of the embodiment shown in FIG. 4;

Figure 6:
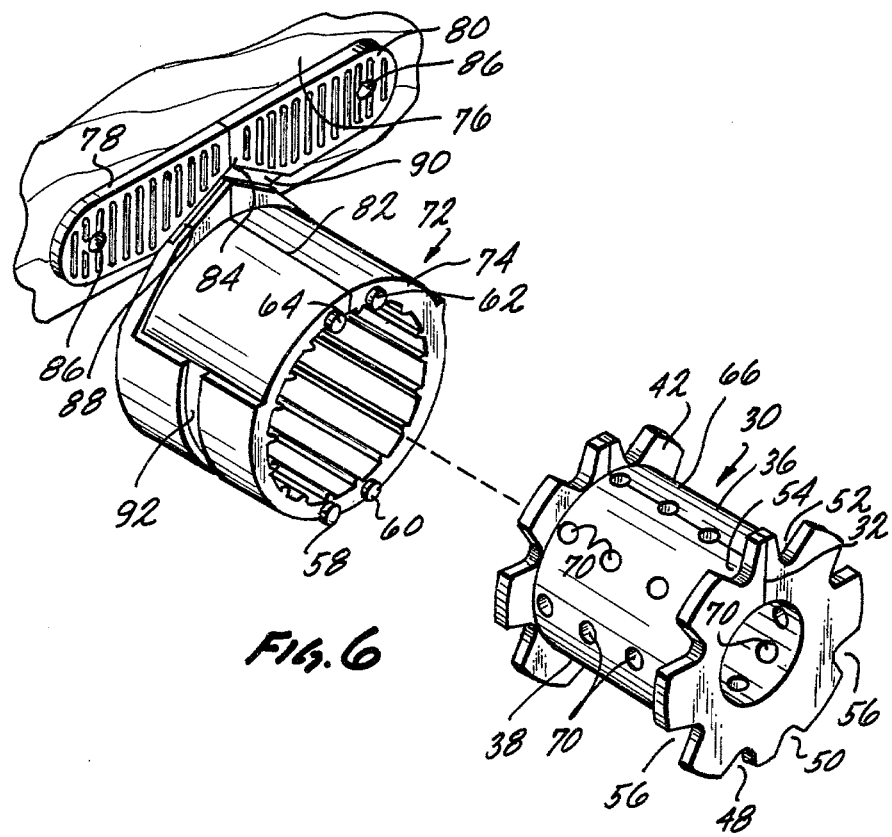
FIG. 6 is an isometric view of a third embodiment of the invention.

The invention described in this specification and shown in the drawings utilizes certain operative principles and/or concepts as are set forth and defined in the claims appended to this specification. Those skilled in the art to which this invention pertains will realize that these principles and/or concepts can be utilized in a number of embodiments differing from the embodiments herein described to illustrate the invention. For this reason this invention is to be construed in light of the claims and is not to be construed as being limited to the illustrated embodiments.

DETAILED DESCRIPTION

In the figures three embodiments of the invention are illustrated. Briefly without assigning numbers at this point all of these embodiments have certain structural features which are common. These include an insert having a slit which is capable of fitting around a pipe or tubular member, a sleeve having a slit which is capable of fitting around the insert, a retaining means retaining the insert to the sleeve, and a support attaching means wherein the sleeve is attached to a support surface. The individual embodiments differ from each other with regard to the support attaching means and the retaining means.

In FIG. 1 of the drawings the first embodiment of the invention is depicted. This embodiment will be described in greater detail than the subsequent embodiments in that all of the embodiments employ certain uniform characteristics which for the sake of brevity need only be described once. The clamp 10 shown in FIGS. 1, 2 and 3 has a cylindrical sleeve 12 which has a slit 14 extending axially through its cylindrical wall 16 at one point. Integrally formed with the sleeve 12 are left and right attaching flanges 18 and 20.

The left and right attaching flanges 18 and 20 project tangentially from the cylindrical sleeve 12 at a point centered about slit 14. An integral unit consisting of the cylindrical sleeve 12 and the left and right attaching flanges 18 and 20 is molded from a semiresilient material such as polypropylene or the like. This gives the sleeve 12 and the flanges 18 and 20 the property of being able to flex somewhat yet having sufficient structural strength to support the load of a water filled pipe or the like. The sleeve 12 can be flexed open by simply grasping the flanges 18 and 20 and bending them outwardly away from each other. Upon release of the flanges 18 and 20 the semiresilient material from which the sleeve 12 is formed will return to its approximate original shape with no distortion of its structure.

To assist in mounting the clamp 10 to a support structure 22 the flanges 18 and 20 are each provided with a hole collectively identified by the numeral 24. Depending on how the clamp 10 is oriented and what material the support structure 22 is formed of, appropriate nails, screws, rivets or the like can be passed through the holes 24 to fixedly mount the clamp 10 to the support structure 22. To assist in securing the clamp 10 to the support structure 22 a plurality of ribs 26 are formed on both left and right flanges 18 and 20 on the surfaces collectively identified by the numeral 28 which is positioned against the support structure 22. If the support structure 22 happens to be a wooden beam or stud the ribs 26 will be depressed slightly into the wood surface assisting in preventing movement of the secured clamp 10.

A liner 30 is sized and shaped to fit within the interior of the sleeve 12. Like the Sleeve 12 the liner 20 is provided with a slit 32. The liner 30 is formed of a flexible material preferably a rubber such as a TPR rubber which is known in the plumbing art. This material is sufficiently firm enough to maintain its shape but sufficiently soft enough to provide for a sound insulation between the sleeve 12 and a pipe 34. Additionally this material is capable of insulating the pipe 34 from galvanic corrosion.

The liner 30 is shaped such that it has a cylindrical body 36 having the above noted slit 32 running axially along its cylindrical wall 38 and an annular flange 40 and 42 located at each of the ends of the cylindrical body 36. The slit 32 divides not only the cylindrical wall 38 but also the flanges 40 and 42 such that the flanges could best be described as split flanges. The cylindrical body 36 is of such a length that when it is mounted within the sleeve 12 the flanges 40 and 42 appropriately fit against the ends 44 and 46 of the wall 16 of the sleeve 12. The abutting relationship of the flanges 40 and 42 with the ends 44 and 46 prevent axial movement of the liner 30 within the sleeve 12.

Both of the flanges 40 and 42 contain a plurality of cutouts or apertures. These apertures are divided into two types. The first of the types of apertures—apertures 48, 50, 52 and 54 serve as retaining means to fixedly hold the liner 30 in the sleeve 12 and the second type of apertures collectively identified by the numeral 56 serve to allow the flanges 40 and 42 to flex when the liner 30 is opened about its slit 32.

Projecting out of the ends 44 and 46 of the wall 16 of the sleeve 12 are projections 58, 60, 62 and 64 identically numbered on both ends 44 and 46. In assembling the liner 30 to the sleeve 12, the sleeve 12 is opened up about slit 14 and the liner 30 is inserted until projection 58 fits within aperture 48, projection 60 fits within aperture 50, and so on for the remaining projections 62 and 64 and apertures 52 and 54, respectively. When the liner 30 is so inserted into the sleeve 12 it can be seen that the slit 32 of the liner 30 aligns with the slit 14 of the sleeve 12. The flanges 40 and 42 are fixedly held in an abutting relationship with the ends 44 and 46. When the sleeve 12 is then opened or closed this motion is communicated to the liner 30 by the interaction of the projections 58, 60, 62 and 64 with the apertures 48, 50, 52 and 54. It can be seen that when the flanges 18 and 20 of the sleeve 12 are spread apart from each other the projections 58 and 60 locked into the apertures 48 and 50 spread the flanges 40 and 42 away from each other at the slit 32. The apertures collectively identified by the numeral 56 allow the flanges 40 and 42 of the liner 30 to distort allowing the liner 30 to mimic the movement of the sleeve 12.

Extending around the outside surface 66 and the inside surface 68 of the cylindrical body 36 are a plurality of hemispherical holes collectively identified by the numeral 70. These holes 70 contribute to the sound insulation properties of the liner 30 as well as reducing the material content of the liner 30 contributing to the economics of the clamp 10.

In use after inserting the liner 30 in the sleeve 12 which can be done either in the factory or on the job site the combination of the liner 30 and sleeve 12 is spread about the slits 32 and 14, respectively, and slipped around the pipe 34. This positions the liner 30 between the pipe 34 and the sleeve 12 and effectively cradles the pipe 34 within the clamp 10 when the sleeve 12 and liner 30 are closed about the pipe 34. The clamp 10 is then slid to the position it will assume with respect to the support structure 22 and appropriately mounted thereon with nails, screws, etc. as previously discussed. As shown in FIGS. 2 and 3 the clamp 10 is used to support a pipe 34 above a support structure 22. As well as supporting a horizontally oriented pipe as shown in this figure in this manner, the horizontally oriented pipe could be suspended by simply inverting the clamp 10. The clamp 10 could also be utilized to appropriately hold a pipe in a vertical or any other position.

The clamp 10 completely isolates the pipe 34 from the support structure 22. This prevents propagation of noise or vibrations from the pipe 34 to the support structure 22. The pipe 34, however, is free to expand or contract along its length by sliding against the inside surface 38 of the liner 30. Because of the materials utilized in the liner 30 heat or cold transmission from the pipe 34 to the support structure 22 is also inhibited. As noted previously electrolysis or galvanic corrosion between the pipe 34 and the support structure 22 is totally inhibited by the nonconducting materials utilized in both the liner 30 and the sleeve 12. Additionally the liner 30 seals around the pipe 34 and thus effectively prevents fluid flow along the outside surface of pipe 34 from one side of the clamp 10 to the other side of the clamp 10.

Figure 7:
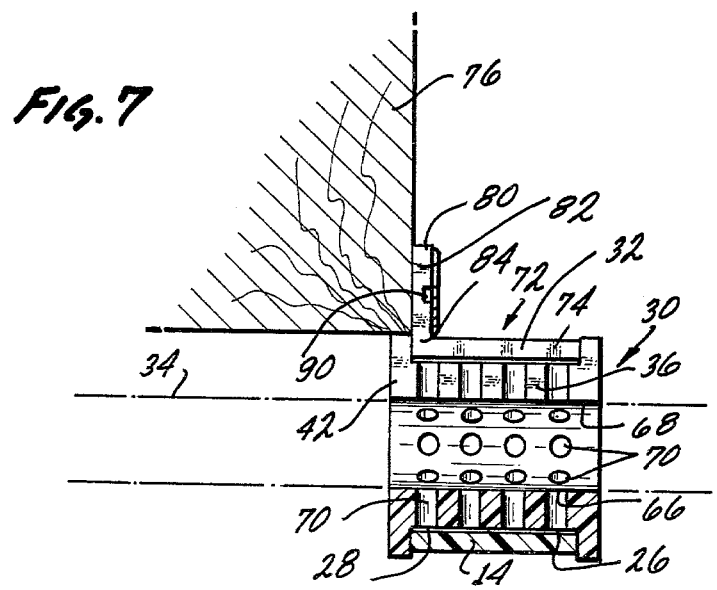
FIG. 7 is a side elevational view in partial section of this embodiment.

In the embodiment illustrated in FIGS. 6 and 7 the clamp 72 utilizes the same type of liner 30 as the clamp 10. For this reason this liner 30 will not be discussed and will be identified by the same numerals previously used. The sleeve 74, however, of the clamp 72 is slightly different from the sleeve 12 in respect to certain details relating to attachment of this sleeve 74 to a support surface 76. The sleeve 74, however, is identical to the sleeve 12 with respect to attachment of the liner 30 to it and therefore like numerals for the projections 58, etc., are used in the figures illustrating this embodiment.

Attaching to the sleeve 74 are left and right flanges 78 and 80. These flanges 78 and 80 are located to the left and right of slit 82, respectively. The flanges 78 and 80 project radially from the wall 84 of the sleeve 74. The clamp 72 is therefore of the type of clamp commonly known as a high ear clamp. As can be seen in FIGS. 5 and 6 this allows the clamp 72 to be mounted to a support structure 76 such that the clamp 72 is mounted to one surface while a pipe 34 runs parallel to a perpendicular surface. The high ear clamp 72 is thus useful in certain installations wherein limited access of certain surfaces of the support structure 76 exists. Additionally it finds utility in supporting a pipe in the center of a hole such as when pipes are run horizontally through a series of wall studs.

The left and right flanges 78 and 80 both contain a hole collectively identified by the numeral 86 to assist in mounting the flanges 78 and 80 to the support structure 76 as described to the previous clamp 10. Incorporated as part of the body of flanges 78 and 80 are channels 88 and 90. These channels 88 and 90 allow the flanges 78 and 80 to be snapped off or severed from the body of the sleeve 74. Extending around the portion of the wall 84 opposite the flanges 78 and 80 is a hemispherical groove 92. The clamp 72 aside from its high ear function can also be appropriately attached to a support structure 76 by removing the flanges 78 and 80 and suspending the clamp 72 in a wire hanger or clevis hanger (not shown). If this type of mounting is used the groove 92 serves as the locating structure for the wire hanger.

In the third embodiment depicted in FIGS. 4 and 5 of the drawings a clamp 94 is illustrated which has certain structural characteristics common with clamps 10 and 72, however, other characteristics which differ slightly. The liner 96 of the clamp 94 differs from the liner 30 in that it has only one annular flange 98. This annular flange 98 is equipped with apertures 48, 50, 52 and 54 identical to those found in liner 30. The cylindrical wall 100 of the liner 96 contains an annular groove 102 located adjacent to the flange 98. The annular groove 102 extends part way down into the wall 100. The remainder of the wall 100 between the groove 102 and the end 104 of the cylindrical wall 100 is then identical to the other liner 30 described in that it has a plurality of holes 106 located on its outside surface 108 as well as on its inside surface 110. The liner 96 is formed of the same type of material as liner 30.

The sleeve 112 of clamp 94 has a cylindrical wall 114 which tapers down at ends 116 and has a disjointed flange 118 on its other end. The flange 118 projects radially outwardly from the cylindrical wall 114. Portions of flange 118 extend inwardly forming keys 120. Projecting axially outwardly from flange 118 are projections 122, 124, 126 and 128 identical in shape and function to projections 58, 60, 62 and 64 previously described. Flange 118 is disjointed in that it contains four cutout areas 130, 132, 134 and 136 which serve a dual function as well as cutout area 138. The function of cutout area 138 and one of the functions of the cutout areas 130, 132, 134 and 136 is to allow sleeve 112 to be opened up about slit 140. Because of the presence of the cutout areas noted above the sleeve 112 is able to open up without interference from the flange 118, i.e., the flange is discontinuous at these points enabling the cylindrical wall 114 of the sleeve 112 to flex at the areas adjacent to where the above noted cutout areas are located.

Liner 96 contains a slit 142 identical in function to slit 32 of liner 30. Annular flange 98 on liner 96 contains four apertures 144, 146, 148 and 150 which are identical in function to apertures 48, 50, 52 and 54 previously noted, i.e., they interact with projections 122, 124, 126 and 128. Additionally flange 98 contains apertures collectively identified by the numeral 152 which serve the same purpose as apertures 56. When the sleeve 112 is spread the liner 96 can be inserted therein. The keys 120 projecting inwardly from flange 118 fit within the groove 102 and the projections 122, 124, 126 and 128 fit within the apertures 144, 146, 148 and 150. The interlocking of the above noted projections and apertures transfers the opening and closing movement of sleeve 112 to liner 96. The interaction of the keys 120 in the groove 102 prevents withdrawal of the liner 96 axially from the sleeve 112. The flange 98 on the liner 96 fits against the flange 118 on the sleeve 112 and in combination with the interlocking of the keys 120 in the groove 102 further prevents the liner 96 from moving within the sleeve 112 in an axial direction toward end 116 of sleeve 112.

Located on the side of cylindrical wall 114 are four locking lugs 154, 156, 158 and 160. When viewed down the central axis of the cylindrical wall 114 of sleeve 112 these locking lugs 154, 156, 158 and 160 are positioned directly in line with the cutouts 130, 132, 134 and 136. A secondary function of the previously noted cutouts is to allow certain portions of the mold in which sleeve 112 is formed to fit through the flange 118 along the cylindrical wall 114 to form the locking lugs 154, 156, 158 and 160. These locking lugs 154, 156, 158 and 160 are formed in pairs such that the individual members of the pairs are spaced 180 degrees apart from one another. Locking lugs 154 and 156 from one pair and locking lugs 158 and 160 form a second pair. When viewed along the longitudinal dimension of the cylindrical wall 114 the pairs of locking lugs are spaced at different positions from the flange 118. As will be hereinafter explained the first pair of locking lugs 154 and 156 are spaced for use in a very narrow wall such as a sheet metal wall and the second pair of locking lugs 158 and 160 are spaced from flange 118 for use in a thicker wall such as a gypsum dry wall.

The locking lugs all project obliquely from the cylindrical wall 114 toward the flange 118. Only one of their ends (not numbered) is attached and integrally formed with the cylindrical wall 114, the other end is spaced outwardly from the cylindrical wall 114 and includes a void area underneath it between it and the cylindrical wall 114. This allows the ends of the locking lugs closest to flange 118 to be compressed downwardly toward and against the cylindrical wall 114.

The clamp 94 is used in situations wherein a pipe 34 traverses through a hole 162 in a support structure 164. In use the clamp 94 is spread open as previously described for the other clamps and slipped around a pipe 34. The clamp 94 is then closed about the pipe 34 cradling the pipe snugly within the liner 96. The clamp 94 is then pushed into a hole 162 which is sized slightly larger than the outside diameter of the cylindrical wall 14. As the clamp 94 is pushed into the hole 162 the set of locking lugs 158 and 160 are first compressed inwardly toward the cylindrical wall 114 and then the other set of locking lugs 154 and 156 are compressed inwardly when they too are pushed into the hole 162. Depending upon the thickness of the support structure 164 either the locking lugs 158 or 160 will be passed completely through the support structure 164 and spring out to their uncompressed positions away from the cylindrical wall 114 or both pairs of the locking lugs will do this. If the support structure 164 is thick the pair of locking lugs 158 and 160 will retain the sleeve 112 and therefore the clamp 94 fixedly attached to the support structure 164. If the support structure 164 is thin the other pair of locking lugs 154 and 156 will be the retaining locking lugs. In either case the clamp 94 is prevented from passing completely through the hole 162 because of interaction of the flange 118 against the surface of the support structure 164. Once the clamp 94 is inserted into the hole 162 it is thus prevented from moving in either direction.

If the pipe 34 moves because of expansion or contraction the liner 96 is retained within the sleeve 112 by the interaction of the keys 120 with the groove 102 as previously explained. The flange 118 on the sleeve 112 can be provided with two holes both numbered 166 spaced 180 degrees apart which can accept small nails. This allows the clamp 94 to be locked into the hole 162 with respect to rotational movement in the hole 162. Normally this is not necessary because the clamp 94 will be fixedly held within the hole 162 by the combination of the pair of locking lugs and the flange 118.

The embodiments of this invention encompassing clamps 10 and 72 were illustrated with the liner 30 having the flanges 40 and 42. It will, of course, be realized that these embodiments could also be manufactured wherein only one flange is provided as per clamp 94 and a sleeve flange and liner groove utilized. The slits in both the sleeves and liners are shown as being straight, however, it is not mandatory that they be so formed. The slits could be shaped other than straight as long as the slit in the liner matches the slit in the sleeve and can be positioned with respect to it such that when the sleeve is open the liner mimics this movement and the pipe or tubular member can be inserted within the liner.

While it is not mandatory for proper functioning of the invention, the projections on all of the embodiments can optionally be solvent welded or heat welded with the apertures.

I claim:

1. A sound insulating member for isolating a tubular member from a support surface which comprises:
   insert means formed of a flexible material substantially incapable of transmitting sound vibrations and including an insert wall sized so as to be capable of encircling said tubular member;
   sleeve means formed of a semiresilient material capable of maintaining its shape at rest and flexing under the influence of applied force, said sleeve means including a sleeve wall sized such that said insert means is capable of fitting within it;
   each of said sleeve means and said insert means including a slit dividing said walls of both said sleeve means and said insert means such that the portions of said walls located on the respective sides of said slits are capable of being moved with respect to each other allowing both said sleeve means and said insert means to be opened and closed about said slits;

retaining means capable of retaining said insert means in a fixed position within said sleeve means and maintaining said slit in said insert means substantially aligned with said slit in said sleeve means such that both said insert means and said sleeve means are capable of being opened at their respective slits to allow said tubular member to pass through said slits locating said tubular member within both said insert means and said sleeve means and of being closed to cradle said tubular member within said insert means and fixedly hold said insert means within said sleeve means;

said sleeve means including support attaching means capable of attaching to said support surface to fixedly hold said sleeve means to said support surface.

2. A sound insulating member for isolating a tubular member from a support surface which comprises:

insert means formed of a flexible material substantially incapable of transmitting sound vibrations and including an insert wall sized so as to be capable of encircling said tubular member;

sleeve means formed of a semiresilient material capable of maintaining its shape at rest and flexing under the influence of applied force, said sleeve means including a sleeve wall sized such that said insert means is capable of fitting within it;

each of said sleeve means and said insert means including a slit dividing said walls of both said sleeve means and said insert means such that the portions of said walls located on the respective sides of said slits are capable of being moved with respect to each other allowing both said sleeve means and said insert means to be opened and closed about said slits;

retaining means capable of retaining said insert means in a fixed position within said sleeve means and maintaining said slit in said insert means substantially aligned with said slit in said sleeve means such that both said insert means and said sleeve means are capable of being opened at their respective slits to allow said tubular member to pass through said slits locating said tubular member within both said insert means and said sleeve means and of being closed to cradle said tubular member within said insert means and fixedly hold said insert means within said sleeve means;

said sleeve means including support attaching means capable of attaching to said support surface to fixedly hold said sleeve means to said support surface;

said retaining means being capable of fixedly holding said insert means within said sleeve means such that when said sleeve means is flexed under the influence of an applied force to open said sleeve means about its slit said insert means concurrently opens about its slit.

3. The support member of claim 2 wherein:

said insert means includes an insert body having a cylindrical insert wall and an axially oriented slit extending longitudinally through said cylindrical insert wall.

4. The support member of claim 3 wherein:

said sleeve means includes a groove member having a cylindrical sleeve wall and an axially oriented slit extending longitudinally through said cylindrical sleeve wall.

5. The support member of claim 4 wherein:

said insert body includes an annular split flange located on at least one of the ends of said cylindrical insert wall and projecting radially outwardly from said insert wall, said slit in said cylindrical insert wall extending through said flange such that both said insert wall and said flange are capable of opening at said slit;

said insert body fitting within said sleeve member and said flange abutting against one of the ends of said cylindrical sleeve wall when said insert body is located within said sleeve.

6. The support member of claim 5 wherein:

said insert body includes an annular split flange located on both ends of said cylindrical insert wall, each of said flanges projecting radially outwardly, said slit in said cylindrical insert wall extending through both of said flanges such that said insert wall and both of said flanges are capable of opening at said slit;

said cylindrical insert wall and said cylindrical sleeve wall sized such that when said insert body is located within said sleeve member said flanges on the ends of said insert wall abut against the respective ends of said cylindrical sleeve wall fixedly holding said insert body against axial movement within said sleeve member.

7. The support member of claim 5 wherein:

said retaining means includes said cylindrical sleeve wall having a plurality of projections projecting axially around its perimeter on one of its ends;

said insert body includes a plurality of apertures equal in number to said plurality of projections and located in the surface of said flange on said insert body and positioned such that each of said projections fit within one of said apertures when said insert body is located within said sleeve member and said flange is abutting against said end of said cylindrical sleeve wall wherein said projections are located;

said projections locking with said apertures such that when said sleeve member is opened about said slit in said cylindrical sleeve wall said motion is transferred to said insert body opening said insert body about said slit in said insert body.

8. The support member of claim 6 wherein:

said retaining means includes said cylindrical sleeve wall having a plurality of projections projecting axially around its perimeter on both of its ends;

said insert body includes a plurality of apertures located in the surface of said flanges on said insert wall, said plurality of apertures on one of said flanges equal in number to the plurality of projections on one end of said sleeve wall and the plurality of apertures on the other of said flanges equal to the plurality of projections on the other end of said sleeve wall and both of said pluralities of apertures positioned on each of said respective flanges such that each of said projections fit within one of said apertures when said insert body is located within said sleeve member and said flanges abut against the respective ends of said sleeve wall;

said projections locking with said apertures such that when said sleeve member is opened about said slit in said sleeve member, said motion is transferred to said insert body opening said insert body about said slit in said insert body.

9. The support member of claim 7 wherein:
said support attaching means includes an annular split sleeve flange integrally formed on one of the ends of said cylindrical sleeve wall and projecting radially outwardly from said sleeve wall;
said plurality of projections projecting outwardly from the surface of said sleeve flange;
said sleeve flange capable of abutting against said support surface when said support surface includes a hole smaller than the outer perimeter of said sleeve flange but sized to allow said sleeve wall to slide into said hole.

10. The support member of claim 9 including:
a plurality of extensions integrally formed with said sleeve flange and projecting inwardly toward the interior of said sleeve wall;
a groove on said insert wall positioned such that said extensions are capable of fitting into said groove when said insert body is located within said sleeve member.

11. The support member of claim 10 wherein:
said support attaching means includes at least one locking lug located on the outside surface of said cylindrical sleeve wall and projecting obliquely from said outside surface toward said sleeve flange, one end of said locking lug integrally formed with the outside surface of said sleeve wall, said integrally formed end being distal from said sleeve flange, the other end of said lug spaced away from the outside surface of said cylindrical sleeve;
said lug capable of distorting along its length such that when said sleeve wall is inserted into said hole in said support surface said other end of said lug moves toward the surface of said sleeve wall allowing said locking lug to slide within said hole and when said locking lug is moved completely through said hole to the opposite side of said support surface said lug returns to its original shape positioning said other end of said lug outwardly with respect to said outside surface of said sleeve wall locking said support surface between said sleeve flange and said locking lug.

12. The support member of claim 11 including:
a plurality of locking lugs located on the outide surface of said cylindrical sleeve wall and positioned on said cylindrical sleeve wall such that at least one of said locking lugs is spaced at one distance axially from said sleeve flange and at least another of said locking lugs is spaced axially at a different distance from said sleeve flange such that said sleeve wall is capable of being retained in a locked position in support surfaces of at least two different thicknesses by said plurality of said locking lugs.

13. The support member of claim 8 wherein:
said support attaching means includes two attaching flanges integrally formed with said cylindrical sleeve wall and projecting radially from said cylindrical sleeve wall, one of said attaching flanges located on one side of said slit in said sleeve wall and the other of said flanges located on the other side of said slit in said sleeve wall.

14. The support member of claim 8 wherein:
said support attaching means includes two attaching flanges integrally formed with said cylindrical sleeve wall and projecting tangentially from said sleeve wall, one on one side of said slit in said sleeve wall, the other on the other side of said slit in said sleeve wall.

* * * * *